United States Patent [19]

Crevasse

[11] Patent Number: 5,215,495
[45] Date of Patent: Jun. 1, 1993

[54] ONE-PIECE SHIRRED CASING

[75] Inventor: Gary A. Crevasse, Rochester Hills, Mich.

[73] Assignee: Viscofan, Industria Navarra de Envolutras Celulosicas, Spain

[21] Appl. No.: 880,056

[22] Filed: May 7, 1992

[51] Int. Cl.⁵ ............................................. F16L 11/08
[52] U.S. Cl. .................................. 452/21; 138/118.1; 206/802; 426/138; 452/22
[58] Field of Search ..................... 138/118.1; 426/105, 426/135, 138, 140; 206/802; 428/34.3, 34.8

[56] References Cited

U.S. PATENT DOCUMENTS

| | | |
|---|---|---|
| 3,882,252 | 5/1975 | Winkler . |
| 3,892,869 | 7/1975 | Sheridan et al. . |
| 4,007,761 | 2/1977 | Beckman . |
| 4,013,099 | 3/1977 | Gerigk et al. . |
| 4,033,382 | 7/1977 | Eichin ............................. 138/118.1 |
| 4,132,047 | 1/1979 | Gerigk ............................ 206/802 |
| 4,263,942 | 4/1981 | Lenhart ........................... 138/118.1 |
| 4,327,777 | 5/1982 | Michel ............................ 138/118.1 |
| 4,363,819 | 12/1982 | Steffen . |
| 4,422,215 | 12/1983 | Liekens ............................ 206/802 |
| 4,430,772 | 2/1984 | Michel et al. . |
| 4,439,890 | 4/1984 | Kazaitis . |
| 4,466,463 | 8/1984 | Kupcikevicius . |
| 4,466,464 | 8/1984 | Kupcikevicius . |
| 4,466,465 | 8/1984 | Frey . |
| 4,466,466 | 8/1984 | Raudys . |
| 4,466,984 | 8/1984 | Kupcikevicius . |
| 4,551,370 | 11/1985 | Nausedas . |
| 4,585,680 | 4/1986 | Nausedas . |
| 4,641,687 | 2/1987 | Kupcikevicius . |
| 4,867,204 | 9/1989 | Ellis . |
| 5,027,863 | 7/1991 | Kupcikevicius . |
| 5,038,832 | 8/1991 | Mahoney et al. . |
| 5,045,020 | 9/1991 | Neeff .................................... 452/22 |

OTHER PUBLICATIONS

Karmas, *Sausage Casing Technology*, pp. 259–329, 1974.
Fill-Clip-Automat Type SFC 7006 poly-clip Viscora Flash, No. 21—Mar. 1972.

Primary Examiner—Bruce M. Kisliuk
Assistant Examiner—Jack Lavinder
Attorney, Agent, or Firm—Harness, Dickey & Pierce

[57] ABSTRACT

A one-piece shirred casing article that finds particular utility in making dry sausages such as pepperoni is disclosed, as is a method for making the article and for using it. A tied one-piece casing is shirred into a compact form and encased in a temporary container which enables the operator to easily place the casing onto the stuffing horn for filling without requiring hand shirring. The use of larger diameter and shorter length stuffing horns is enabled when compared to the use of sticks or strands of long lengths of casings used to form multiple sausage products.

18 Claims, 4 Drawing Sheets

ONE-PIECE SHIRRED CASING

BACKGROUND OF THE INVENTION

Technical Field

This invention relates to casings such as small caliber fibrous sausage casings used to make dry sausages.

Discussion

Small caliber (less than about 85 millimeters in diameter) fibrous sausage casings have been used in the marketplace for many dry sausage varieties. Because of the precise nature of the diameter of these small caliber casings, they offer an excellent container for slicing products, especially where exact weight slices are required. One sausage variety, which is used extensively with these small caliber casings, is pepperoni. Pepperoni slices are often used as pizza toppings. Most manufacturers of frozen or fresh pizzas demand that the pepperoni be precise in caliber and weight so that when the sausage is sliced, all of the slices are the same. In such manner the pizza maker maintains control over the amount of toppings thereby eliminating the practice of adding more slices on the pizza just to make sure that the pizza meets all applicable labeling and other regulatory requirements.

The aesthetics of the pepperoni slices is as equally important as its size and weight control. When a pizza is heated some pepperoni slices have a tendency to curl up or "cup" thereby degrading the otherwise eye-appealing nature of the pizza. The propensity of slices to "cup" is due, at least in part, to the way in which the pepperoni is stuffed.

FIG. 1 illustrates a conventional manner in which pepperoni sausages are stuffed. The machine 10 is a commercially available stuffing machine such as is sold under the POLY-CLIP brand, type SFC 7006 available from Neidecker Company of Frankfort, Germany. Of course, other suitable stuffing machines have been used for this purpose. plurality of dry, flat casings 12a which are tied at one end are shown lying on a work table 14. Casings 12 are only about 40 to 70 inches in length and are designed to encase only one sausage or "chub". These casings 12a are soaked by the operator in a tub 16 until they become pliable. The operator removes the soaked casings 12b from the tub 16 and shirrs the soaked casings 12b, by hand, onto a stuffing horn 18. In the machine shown in FIG. 1, there are three stuffing horns mounted on a rotating turret.

The hand shirring of the casing onto the stuffing horn is a tedious and time consuming task. It further requires repetitive hand shirring motions from the operator which, when multiplied by the number of casings shirred on a typical work shift, produces an exceedingly large number of wrist bending motions that are required.

The machine 10 is then cycled bringing a horn 18 with a shirred casing 12c thereon into the filling station whereby the meat emulsion is forced from a hopper 20 through the horn 18 and into the casing. The machine 10 uses a clipper 22 to clip the rearward end of the casing. The filled casing 12d is discharged onto the table 14. These so-called "green" sausages are then carried to a suitable fermentation room or smoke house where the sausage is processed.

Another method which is described, for example, in Section III of the publication entitled *Sausage Casing Technology*, edited by Endel Karmas, published by Noyes Data Corporation, Park Ridge, N.J. (1974) uses long lengths of casings which have been shirred into a stick or strand, as compared with the use of individual pieces of casing as described in connection with FIG. 1. Typically, the shirred strands contain around 20 meters of casing which have been shirred or compacted into a length of about 14–17 inches. The strand is overwrapped with a netting which prevents de-shirring of the strand and permits the strand to be subsequently soaked (if not premoistened) to render the casing pliable in the shirred condition. After soaking, the overwrap is removed and the strand is placed onto the horn of the stuffing machine. A more sophisticated machine is required when using strands, as compared to pieces, since it must be able to double clip, cut and loop the casing as well as fill it with the meat emulsion. An example of a machine of this type is the SUPER POLY CLIP machine also available from Neidecker Company, Frankfort, Germany. This machine is capable of producing multiple sausages from one strand since the strand contains a much longer length of casing, usually enough casing to form 20 to 50 sausages from one strand.

This latter technique has the advantage that it eliminates hand shirring of the casing. However, it also has its disadvantages. For example, the diameter of the stuffing horn is generally smaller than horns for one-piece casings. By way of an example, for a 50 millimeter diameter sausage, a 28 or less millimeter diameter stuffing horn is typically used for shirred casings whereas a 36 millimeter stuffing horn may be used for one-piece casings. This discrepancy is generally due to the need to use a small diameter shirring mandrel in order to compact the many meters of casing into a length compact enough to fit the machine. This problem is further exaggerated during soaking of the strands in preparation for stuffing. During soaking, the strand may swell causing its internal diameter to become even smaller thus requiring a still narrower stuffing horn. The use of a longer, smaller diameter stuffing horn results in slower throughput, more fat smear, poorer particle definition and the aforementioned cupping problem during heating of the pepperoni slices.

The present invention is directed to solving one or more of these problems.

SUMMARY OF THE INVENTION

Pursuant to the teachings of this invention, a shirred one-piece casing article is provided that eliminates the problems associated with the conventional hand shirring operations while at the same time avoiding the disadvantages of the use of long lengths of casings shirred into strands.

In accordance with the teachings of the present invention, a one-piece shirred length of casing is packaged in a compact manner which prevents de-shirring of the casing prior to stuffing. The casing article is capable of being hand held by an operator of a stuffing machine and easily manipulated to place it onto a stuffing horn without requiring hand shirring of the casing.

In the preferred embodiment, the rearward end of the shirred casing abuts a rear disk having an outer diameter greater than the outer diameter of the shirred casing. A second disk is located adjacent to a front end of the casing which is tied and passes inwardly through the second disk. An overwrap or sleeve of flexible material is stretched over the disks and forms a container of less than about 6 inches in length for the casing. The sleeve is connected to the disks with sufficient force to maintain the disk-to-disk connection to prevent de-shirring of the casing prior to stuffing and to keep the container intact and on the stuffing horn during stuffing.

The one-piece shirred article according to the present invention can be placed onto the stuffing horn in one simple motion permitting significantly increased stuffing speeds and a much more efficient operation. It eliminates hand shirring onto the stuffing horn and avoids health hazards associated with repetitive wrist motions. Moreover, the one-piece shirred article can be used on short, large diameter stuffing horns thereby avoiding problems such as cupping of the slices and other drawbacks created by the use of small diameter stuffing horns used with shirred strands.

A method of making the casing article and the use thereof to stuff a one-piece sausage is also disclosed.

BRIEF DESCRIPTION OF THE DRAWINGS

These and various other objects and advantages of the present invention will become apparent to those skilled in the art upon a study of the following specification and by reference to the drawings in which.

DETAILED DESCRIPTION OF THE PREFERRED EMBODIMENT

It should be understood at the outset that while this invention is described in connection with one particular example, that various modifications will become apparent to those skilled in the art after having the benefit of reading this detailed description.

In the preferred embodiment, a one-piece small caliber, fibrous casing 24 is the starting component. For purposes of this invention, the term "one-piece casing" means that the casing is only long enough to encase one sausage. Typically, the length of the unshirred casing 24 is about 40 to 60 inches but no longer than about 70 inches. This is to be compared to the situation where long lengths, often 20-25 meters, of casings are shirred into a compacted strand, with the strands being used to make a large number of sausages. Casing 24 is made of cellulose reinforced with fibers in a manner known in the art and referred to simply as fibrous casing. It also has a relatively small inner diameter of about 40 to 55 and no more than 85 millimeters in diameter. Casing 24 has been pre-tied and provided with a loop 26 at its forward end in a manner known in the art. Thus far, casing 24 is known per se and is available from a variety of manufacturers such as Brechteen Co. as "Tied, Fibrous" casing.

Figure 2:
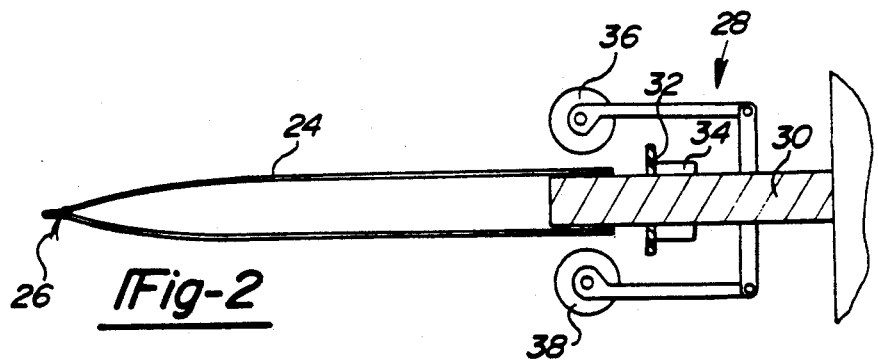
FIG. 2 is a cross-sectional view which schematically illustrates a step in shirring the casing article of the present invention.
Figure 3:
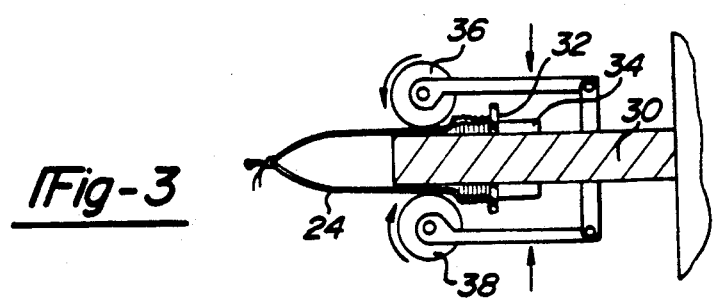
FIG. 3 is a cross-sectional view illustrating the shirring process at a subsequent step.

The method of making the article of the present invention will now be described. Turning to FIG. 2, shirring apparatus 28 is schematically illustrated for shirring the one-piece casing 24. Apparatus 28 generally includes a shirring mandrel 30 having a relatively large outer diameter. A rear annular disk 32 is slid over the end of mandrel 30 and abutted against a stop 34. Then, the open end of casing 24 is threaded over mandrel 30 until it is underneath a pair of shirring wheels 36, 38. Wheels 36, 38 are rotated and brought into contact with casing 24 as shown in FIG. 3. This causes the flat casing 24 to be compacted or shirred into a length of less than about 8 inches, preferably about 4 to 6 inches.

Figure 4:
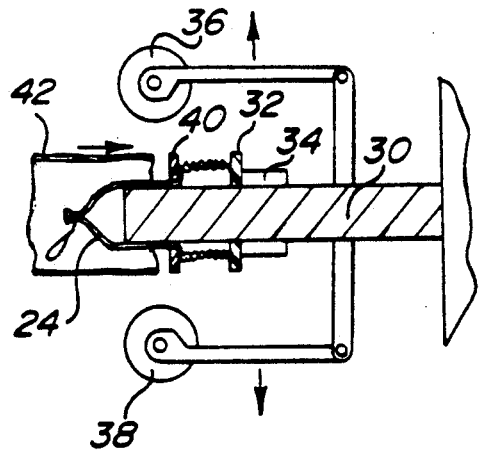
FIG. 4 is a cross-sectional view illustrating the sleeve overwrapping being applied to the shirred casing.

With reference to FIG. 4, the shirring wheels 36, 38 are then retracted from the shirred casing and a second disk 40 is slipped over the forward end of the casing and onto to the mandrel 30. A sleeve 42 of flexible material is then stretched over the forward disk 40 and rear disk 32 covering the shirred casing 24. The completed article 44 is then removed from the mandrel 30.

Figure 5:
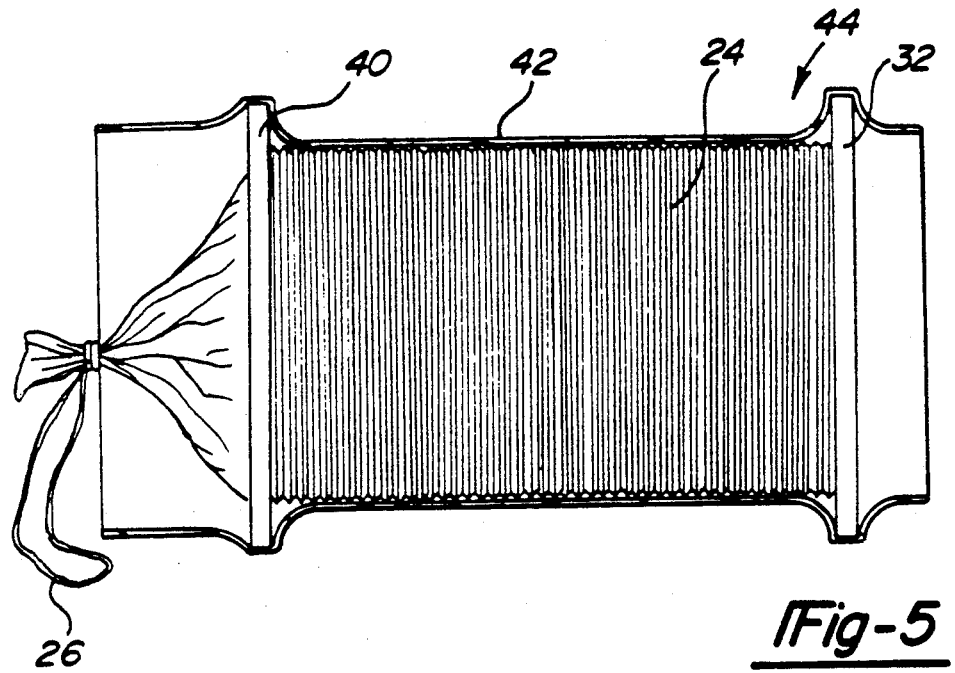
FIG. 5 is a cross-sectional view of the completed one-piece shirred sausage casing article.
Figure 6:
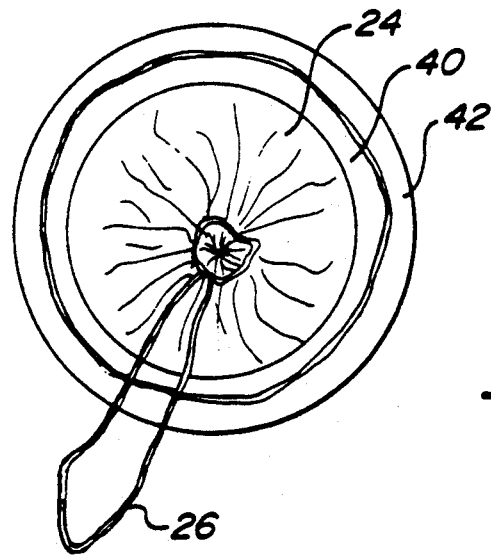
FIG. 6 is a front end view of the article.

FIGS. 5 and 6 illustrate the one-piece shirred casing article 44 in more detail. The sleeve 42 and disks 32, 40 define a container for the shirred casing 24. The sleeve 42 is made of a material which is sufficiently flexible so that it adheres to the outer surfaces of disks 32, 40 and keeps the container intact to prevent the shirred casing 24 from de-shirring or unraveling during storage and handling. The adhesion between the sleeve 42 and disks 32, 40 is also sufficient so that the contain. defined thereby remains intact and on the stuffing horn during and after the filling operation, as will appear.

By way of a non-limiting example, sleeve 42 is a tubular sheet of ethylene vinyl acetate (EVA) approximately 2 to 3 mils thick and about 8 inches in length. The outer diameter of the rings 32, 40 should be greater than the outer diameter of the shirred casing 24 by at least about 15 percent. Otherwise, the casing 24 may have a tendency to lift the overwrap sleeve 42 from the disks 32, 40 thereby degrading the structural integrity of the container. By way of a non-limiting example, the following Tables I and II provide representative dimensions for casing article 44 with two different size casings:

| TABLE I | TABLE II |
|---|---|
| flat casing length: 60" | flat casing length: 60" |
| flat casing size: No. 1 (fibrous) | flat casing size: No. L1¼ (fibrous) |
| shirred casing I.D.: 41 mm | shirred casing I.D.: 41 mm |
| shirred casing O.D.: 50 mm | shirred casing O.D.: 54 mm |
| disk O.D.: 57.5 mm | disk O.D.: 62 mm |
| unstretched sleeve O.D.: 47 mm | unstretched sleeve O.D.: 51 mm |
| article length: 4–6" | article length: 4–6" |

Disks 32, 40 can be made of any suitable material such as polypropylene.

If desired, the casing 24 can be premoistened to eliminate the need for soaking by the meat packer. In such case, casing 24 should include a moisture content of about 48 percent based upon the total weight of the casing for most pepperoni and dry sausage applications. The appropriate amount of moisture can be applied by a variety of means such as by spraying the interior of the casing during the shirring process. A suitable antimycotic may also be employed to increase shelf life. Alternatively, if the casing is not premoisturized, it needs to be soaked by the meat packer prior to stuffing. In such case, the article 44 should be immersed in a tub as necessary to achieve the appropriate amount of moisture.

In either case, the one-piece shirred casing article 44 lends itself to efficient high volume production of quality sausages with desirable characteristics. The article 44 is easily held in the hand by the operator and is readily manipulated. Instead of the hand shirring operation discussed in connection with the PRIOR AR technique of FIG. 1, the operator merely needs to slide the open rearward end of the article 44 over the stuffing horn 18. There is no need for hand shirring.

Figure 7:
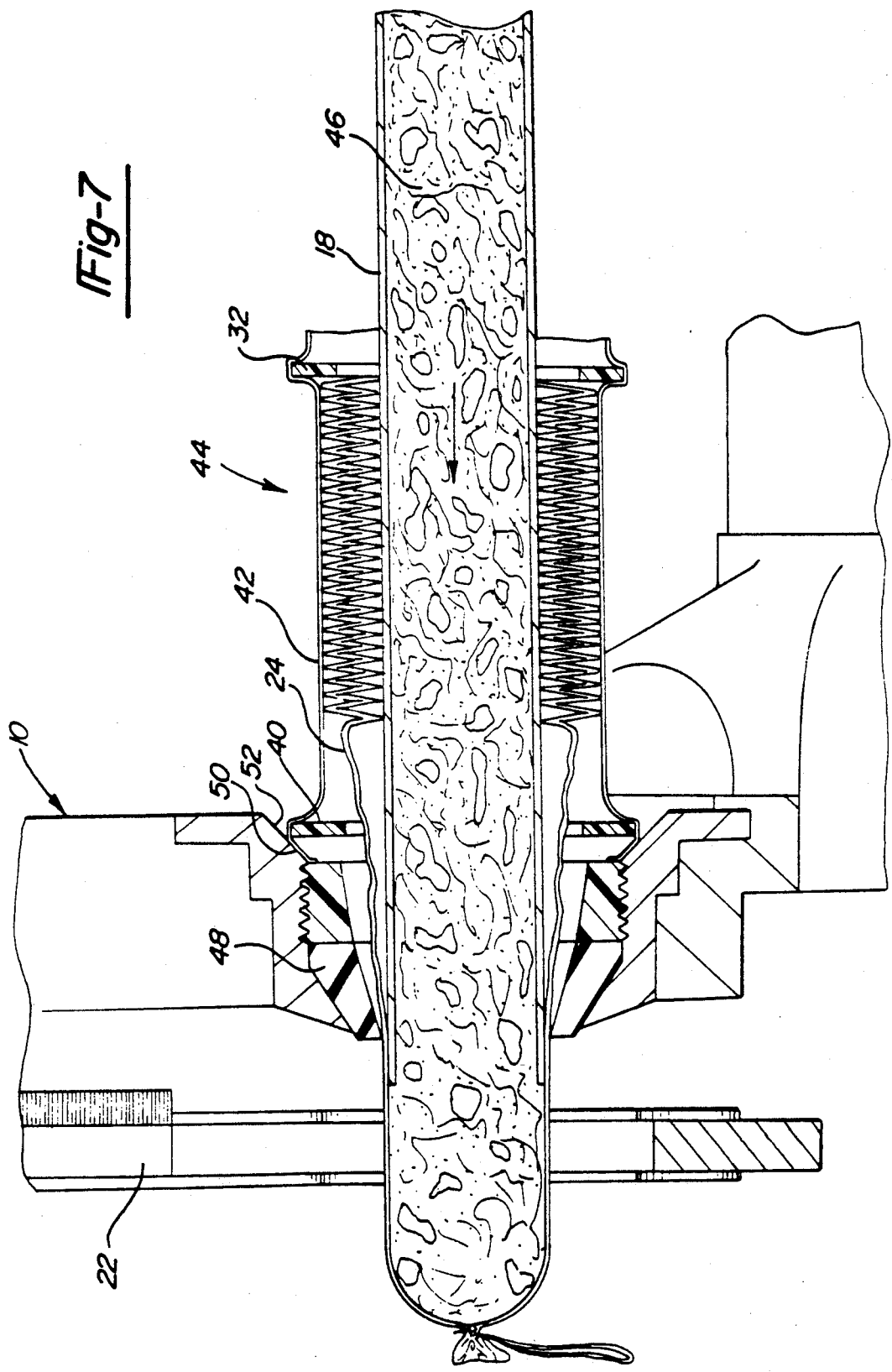
FIG. 7 is a partial cross-sectional view showing the casing article on a stuffing horn and the casing being stuffed.

FIG. 7 illustrates the article 44 when the horn 18 has been rotated into the stuffing position and the casing 24 is being filled with meat emulsion 46. In the stuffing position, the horn 18 protrudes through an opening in a brake ring assembly 48 in machine 10. When the brake ring assembly 48 is in the stuffing position and filling begins, ring 40 wedges the forward edge 50 of the sleeve 42 against the throat 52 of the assembly 48. The casing 24 is de-shirred and fed out of the assembly 48 by the force of the meat emulsion 46 during the filling operation. During filling, the front ring 40 is abutted against the assembly 48 by the stuffing and de-shirring action. The inner walls of disk 40 provide a stop for preventing further forward motion of the shirred casing and facilitates controlled de-shirring of the casing 24 through the inner diameter of the ring 40. The container formed by the sleeve 42 and disks 32, 40, however, remains intact as an integral unit during filling.

Figure 1:
FIG. 1 is a perspective view of a PRIOR ART sausage stuffing operation.
Figure 8:
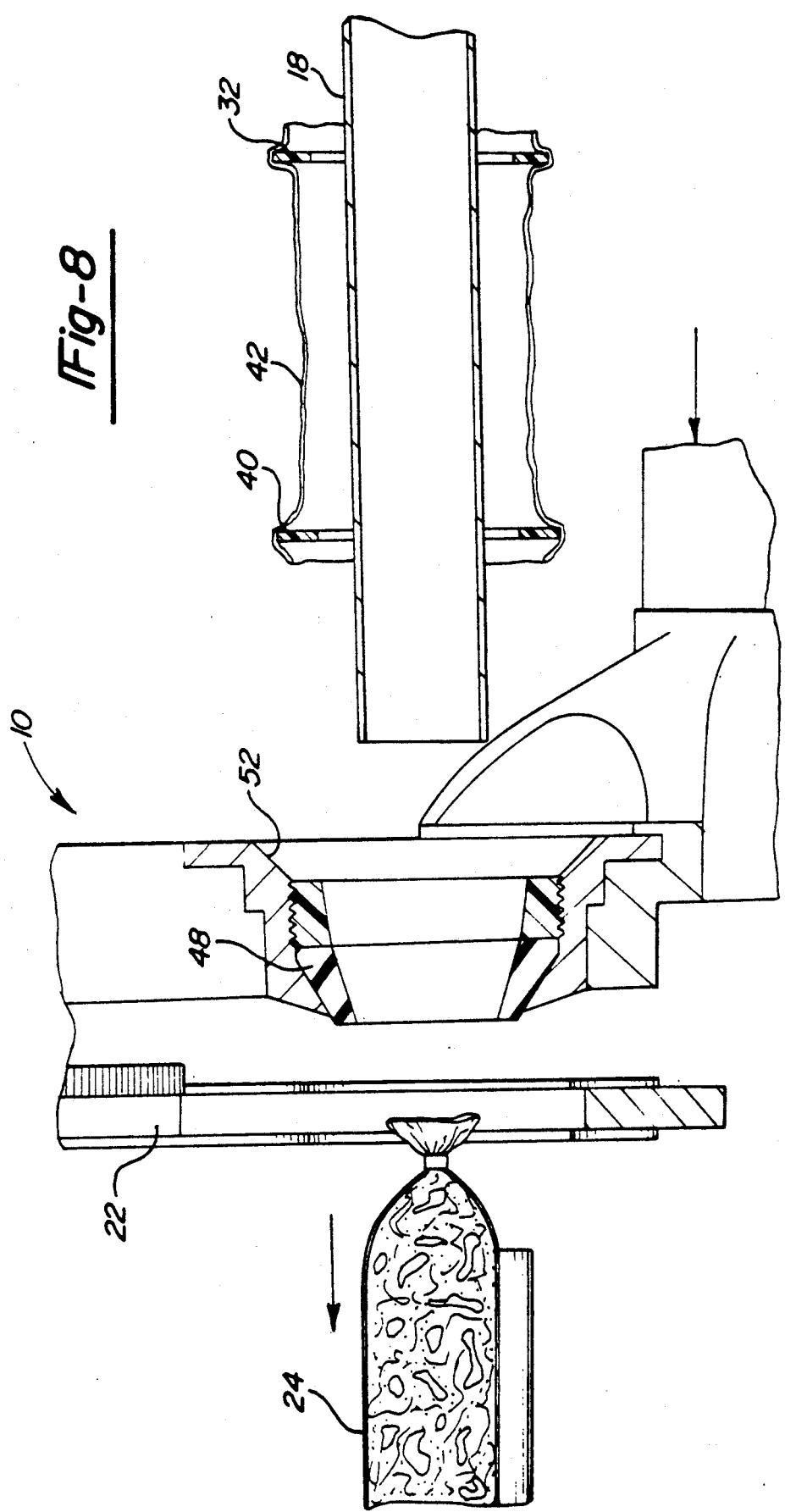
FIG. 8 is a view, similar to FIG. 7, illustrating the rear end of the casing being clipped while the empty sleeve remains on the stuffing horn.

As shown in FIG. 8, the rearward end of the filled sausage casing 24 is clipped by clipper 22 and fed onto table 14 (FIG. 1). The clipper retracts and the stuffing horn 18 with the spent container remaining on it cycles to the unloading station where the spent container is easily slipped off of the horn 18. Simultaneously, a previously loaded horn is cycled into the filling position for filling a new casing.

The various advantages of the present invention should now become apparent to those skilled in the art. Since the casing article 44 utilizes only a comparatively short one-piece casing 24, a relatively large shirring mandrel 30 can be used thereby resulting in a larger inner diameter (e.g., at least about 40 mm) for the shirred casing 24 when compared to strands of longer lengths of casing. This, in turn, permits the use of a comparatively larger stuffing horn 18. By way of an example, a 41 millimeter O.D. shirring mandrel 30 and a 36 millimeter O.D. stuffing horn 18 can be used with the present invention for a casing having a recommended 50 millimeter stuffing diameter. In contrast, a smaller (e.g., 32-36 millimeter) shirring mandrel is often used to shirr large amounts of casing into a strand necessitating a longer, smaller (e.g., 28-32 millimeter) stuffing horn 18 for a comparably sized sausage product. In addition to the immediate application of the present invention to stuffing horn lengths currently in se, e.g., 13-15 inches, stuffing horns with even shorter lengths can be used; for example, 8-10 inch long stuffing horn can be used in comparison with a 17 inch long stuffing horn which is typically used with shirred strands. The ability to use stuffing horns that are shorter and with larger diameters provides a much more rapid throughput of the meat emulsion, less fat smearing and better cooking performance by substantially eliminating the "cupping" phenomena when slices of pepperoni are heated on the surface of a pizza. All of these advantages can be achieved while at the same time eliminating the time consuming and laborious task of hand shirring the casings.

Still other advantages will become apparent to those skilled in the art after a study of the foregoing specification, drawings and following claims. For example, while the invention was described in connection with a small caliber fibrous casing as a particular example, the present invention has applicability to casings made of other materials such as collagen, non-reinforced cellulose and plastic. The casing article can also be used to stuff a wide variety of tubular encased products such as human or animal food, dough and even non-food products such as cement. Various other materials can be used for the sleeve such as perforated wrappings or nettings of materials having the desired characteristics. Therefore, while this invention has been described in connection with a particular example, no limitation is intended thereby except as defined in the appended claims.

What is claimed is:

1. A casing article for encasing a single stuffable product, said article comprising:
   a one-piece length of casing for encasing a single product the casing being shirred,
   container means for holding the one-piece shirred length of casing and for preventing de-shirring of the casing prior to stuffing; and
   said article being of compact size capable of being held by an operator of a stuffing machine and easily manipulated by hand to place the article onto a stuffing horn without requiring hand shirring of the casing.

2. The casing article of claim 1 wherein the container means comprises:
   a rear disk adjacent to a rearward end of the shirred casing;
   a forward disk adjacent to a front end of the casing;
   the front end of the casing being tied and passing inwardly through the forward disk;
   a sleeve of flexible material stretched over the disks and forming a container for the shirred casing having a length less than about 6 inches; and
   the sleeve being connected to the disks with sufficient force so that the container prevents de-shirring of the casing prior to stuffing and so that the container remains on the stuffing horn during stuffing.

3. The casing article of claim 2 wherein the rear and forward disks have outer diameters greater than the outer diameter of the shirred casing.

4. The casing article of claim 3 wherein the sleeve, prior to being stretched over the disks, is a tubular film having an outer diameter less than the outer diameter of the disks.

5. The casing article of claim 2 wherein the sleeve is a film of ethylene vinyl acetate (EVA) approximately 2 to 3 mils thick.

6. The casing article of claim 1 wherein the casing has a length, prior to shirring, of less than about 70 inches.

7. The casing article of claim 6 wherein the casing is a small caliber fibrous casing used to make pepperoni.

8. The casing article of claim 1 wherein the casing is premoistened sufficiently to eliminate soaking by the operator prior to stuffing.

9. The casing article of claim 1 wherein the inner diameter of the shirred casing is at least 40 millimeters thereby permitting the use of larger diameter and shorter stuffing horns than compared with horns used with strands of longer lengths of casing.

10. A casing article for encasing a single stuffable sausage, said article comprising:

a one-piece length of casing for encasing a single sausage, the casing being shirred, said casing having a closed end and an open end;

container means for holding the one-piece shirred length of casing and for preventing de-shirring of the casing prior to stuffing, with the closed end of the casing being arranged so that it can extend form the container means during stuffing; and said article being of compact size capable of being held by an operator of a sausage stuffing machine and easily manipulated by hand to place the open end of the casing onto a stuffing horn without requiring hand shirring of the casing, with the casing being pushed from the container as meat emulsion is forced through the stuffing horn into the closed end of the casing, the open end of the casing being thereafter closed to form a single sausage product.

11. The casing article of claim 10 wherein the casing is a fibrous casing for making pepperoni.

12. The casing article of claim 11 wherein the fibrous casing is less than about 85 millimeters in diameter.

13. The casing article of claim 12 wherein the casing is about 40-70 inches in length prior to shirring.

14. The casing article of claim 13 wherein said container means comprises:

a sleeve of radially stretchable material stretched over rear and forward disks respectively abutting rear and forward portions of the shirred casing.

15. The casing article of claim 14 wherein the closed end of the casing is tied and passes inwardly through the forward disk;

wherein the container means has a length of less than about 6 inches; and wherein the rear and forward disks have outer diameters greater than the outer diameter of the shirred casing; with the sleeve, prior to being stretched over the disks, being a tubular stretchable film having an outer diameter less than the outer diameter of the rear and forward disks.

16. The casing article of claim 15 wherein the sleeve is a film of ethylene vinyl acetate (EVA) approximately 2-3 mils thick.

17. The casing article of claim 10 wherein the casing is premoistened sufficiently to eliminate soaking by the operator prior to stuffing.

18. A casing article for encasing a single pepperoni sausage product, said casing article comprising:

a one-piece shirred length of fibrous casing having a length of less than about 70 inches prior to shirring, said casing having an outer diameter of less than about 85 millimeters, and the casing further having a tied end and an open end;

a rear disk abutting folds of the shirred casing towards a rearward end thereof, the rear disk having an outer diameter greater than the outer diameter of the shirred casing;

a forward disk abutting folds of the shirred casing towards a forward end thereof, said forward disk having an outer diameter greater than the outer diamter of the shirred casing, with the tied end of the casing being arranged so that it passes inwardly through the forward disk during stuffing;

a sleeve of radially stretchable material stretched over the disks and forming a container for the shirred casing having a length less than about 6 inches; the sleeve, prior to being stretched over the disk, being a tubular film with an outer diameter less than the outer diameter of the disks; and the sleeve being connected to the disks with sufficient force so that the container prevents de-shirring of the casing prior to stuffing, with the casing article being of compact size to enable an operator of a stuffing machine to easily slip the open end of the casing article on to a stuffing horn without requiring hand shirring of the casing, and whereby the container remains on the stuffing horn during and after stuffing of the casing wherein meat emulsion is forced through the stuffing horn against the closed end of the casing causing the casing to be pushed from the container and filled with the meat emulsion, the open end of the casing being thereafter closed to form a single pepperoni sausage.

* * * * *